United States Patent
Sung et al.

(10) Patent No.: US 7,444,411 B2
(45) Date of Patent: Oct. 28, 2008

(54) INTERNET INTERFACE SERVICE SYSTEM AND METHOD PROVIDING PUBLIC INTERNET ACCESS TO USERS CARRYING MOBILE TERMINALS

(75) Inventors: Jun-Ho Sung, Seoul (KR); Sang-Hoon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1584 days.

(21) Appl. No.: 09/752,513

(22) Filed: Jan. 3, 2001

(65) Prior Publication Data

US 2002/0038369 A1 Mar. 28, 2002

(30) Foreign Application Priority Data

Sep. 15, 2000 (KR) .............................. 2000/54280

(51) Int. Cl.
G06F 15/16 (2006.01)
G06F 15/173 (2006.01)

(52) U.S. Cl. .................... 709/229; 709/225; 709/250

(58) Field of Classification Search .................... 705/40, 705/35; 709/227, 200, 225, 229, 203, 217, 709/246, 250; 379/144, 211.02; 340/995
See application file for complete search history.

(56) References Cited

U.S. PATENT DOCUMENTS

| | | | |
|---|---|---|---|
| 5,339,239 A | | 8/1994 | Manabe et al. |
| 5,949,379 A | | 9/1999 | Yang |
| 6,018,573 A | * | 1/2000 | Tanaka ................... 379/211.02 |
| 6,243,450 B1 | * | 6/2001 | Jansen et al. ........... 379/144.01 |
| 6,393,484 B1 | * | 5/2002 | Massarani ................... 709/227 |
| 6,487,538 B1 | * | 11/2002 | Gupta et al. ................... 705/14 |
| 6,671,681 B1 | * | 12/2003 | Emens et al. ................... 707/5 |
| 6,687,252 B1 | * | 2/2004 | Bertrand et al. ............. 370/401 |
| 6,725,303 B1 | * | 4/2004 | Hoguta et al. ................ 709/227 |
| 2001/0054019 A1 | * | 12/2001 | de Fabrega ................... 705/35 |
| 2002/0047787 A1 | * | 4/2002 | Mikkola et al. ............. 340/995 |

FOREIGN PATENT DOCUMENTS

| | | |
|---|---|---|
| JP | 2-067071 | 3/1990 |
| JP | 8-055070 | 2/1996 |
| JP | 9-190395 | 7/1997 |
| JP | 9-245230 | 9/1997 |
| JP | 11-126186 | 5/1999 |
| JP | 11-134280 | 5/1999 |
| KR | 1999/78483 | 11/1999 |
| KR | 2000/013472 | 3/2000 |

* cited by examiner

Primary Examiner—Paul H Kang
(74) Attorney, Agent, or Firm—Robert E. Bushnell, Esq.

(57) ABSTRACT

An internet interface service system and method are capable of connecting portable mobile terminals of users (such as notebook computers, palm top computers, network computers, PDAs, and the like) to a communication (or internet) network in public places (such as airports, conference places, bus terminals and the like). In accordance with the system and method, the mobile terminals are connected via the communication network to any of a plurality of information providing servers for receiving information. A settlement server is provided for performing electronic settlements of communication connection charges for the mobile terminals. An internet interface unit is provided for enabling the mobile terminals to be connected to the communication network and for charging the users of the mobile terminals for the usage of the internet interface service system. A central management server manages the internet interface unit, allocates dynamic IP addresses when the mobile terminals of users are connected to the internet interface unit, and releases the allocated addresses upon termination of communication of the mobile terminals.

24 Claims, 4 Drawing Sheets

INTERNET INTERFACE SERVICE SYSTEM AND METHOD PROVIDING PUBLIC INTERNET ACCESS TO USERS CARRYING MOBILE TERMINALS

CLAIM OF PRIORITY

This application makes reference to, incorporates the same herein, and claims all benefits accruing under 35 U.S.C. §119 from my application AN INTERNET CONNECTION SERVICE SYSTEM AND THE METHOD THEREOF filed with the Korean Industrial Property Office on 15 Sep. 2000 and there duly assigned Ser. No. 54280/2000.

BACKGROUND OF THE INVENTION

1. Technical Field

The present invention relates to an internet interface service system and method enabling a user to be provided with high-speed internet connection services by connecting to the internet interface service system, the system and method providing high-speed connection service and executing charges through the use of a portable computer which the user carries with himself in public places.

2. Prior Art

In general, the development of internet communications provides a communication environment in which a user who hopes to connect to the internet network can be connected to the internet anywhere through a mobile phone, a leased-line connection service provider, or the like by using a mobile terminal of the user. Accordingly, the user can connect to the internet network and conduct his own business in any place where lines for internet connections are provided (e.g., on business trips, travel, academic conference participation, or the like) by using his own mobile terminal, such as a notebook computer, a palm-top computer, a small-sized network computer, a PDA, or the like. However, there exists an inconvenience in that, in order for a user who has a portable mobile terminal to connect to the internet, the user has to connect his portable terminal to a telephone line or a leased-line furnished in his abode, or has to visit a particular place which provides an internet connection service.

Further, a user can be provided with internet service supplied through an internet service provider (ISP), that is, by use of a general modem connecting his mobile phone or personal communication system (PCS) phone to a portable mobile terminal. However, this causes a problem in that the user must incur expense in order to be provided with the internet service, and the expense can be high since the mobile phone fee is so expensive.

Finally, if the user does not have his portable terminal equipped with internet communication support facilities, such as a local area network (LAN) card, a modem, or the like, there exists another problem in that the user cannot connect to the internet at all.

SUMMARY OF THE INVENTION

Accordingly, in order to solve the above problems, it is an object of the present invention to provide an internet interface service system and method enabling a user who carries a portable mobile terminal with him to connect to the internet and to conduct his business by using his portable mobile terminal in a public place, such as an airport, a conference room, a bus terminal, and so on.

In order to achieve the above object, the internet interface service system and method provide for establishment of a booth in a public place, and provision of an interface unit for making a connection to the internet by using a mobile terminal of a user when he is in the booth, high-speed leased lines for connecting the interface unit to the internet network, a central management server for allocating a dynamic internet provider (IP) address to the user's mobile terminal when connected to the interface unit, and a settlement server for recording or making charges with respect to the internet interface service using the mobile terminal.

The mobile terminal may be a notebook computer, a palm top computer, a network computer, a PDA, or the like.

The interface unit comprises: a connection terminal or a connection unit, such as a LAN cable to which the mobile terminal is to be connected, or an LAN cable to which a LAN card is connected; a communication unit enabling the user to connect to the internet network through his mobile terminal; a settlement unit for charging the user for services based on a charging rate according to a predetermined reference; an output unit for outputting a receipt according to the charging function performed in the settlement unit, and for displaying a message; a storage unit for storing usage information as to the user, and predetermined operating programs for controlling the entire interface unit; and a control unit for controlling the above components according to the operating programs stored in the storage unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENT

Hereinafter, the present invention will be described in detail through the attached drawings indicating an embodiment thereof.

Figure 1:
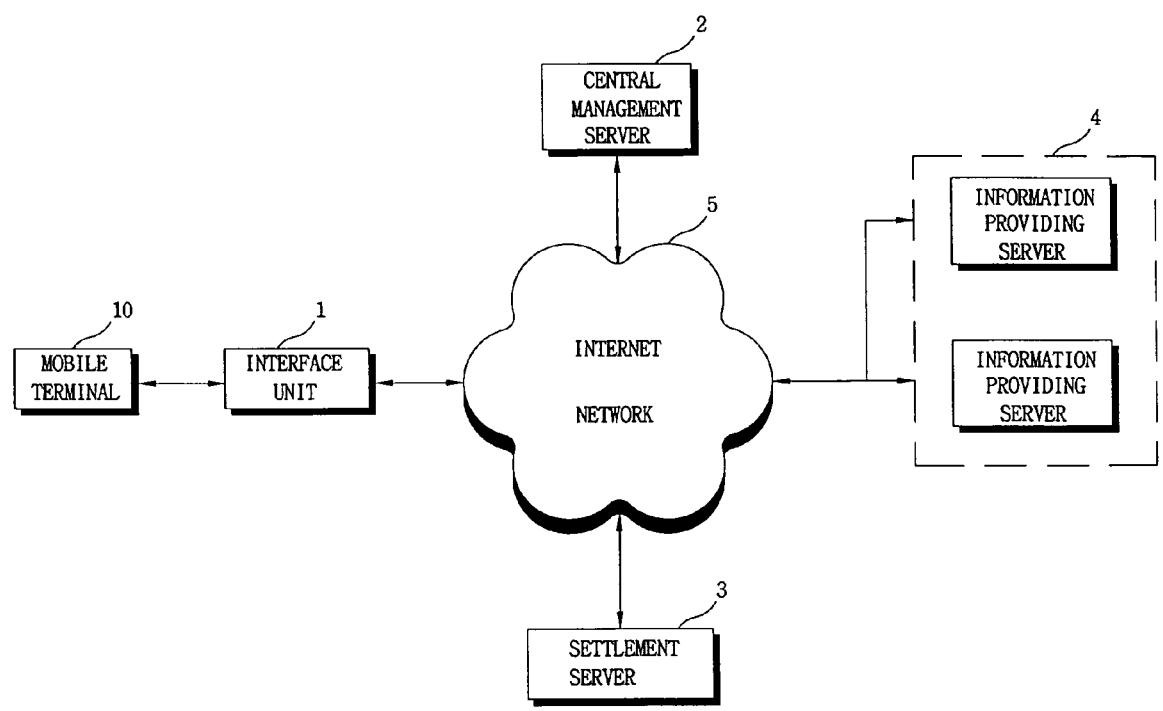
FIG. 1 is a block diagram of an internet interface system according to an embodiment of the present invention.

FIG. 1 is a block diagram of an internet interface service system according to an embodiment of the present invention.

As shown in FIG. 1, the internet interface service system includes: an internet network 5 designed for provision of high-speed internet connection service; plural interface units 1 (only one is shown for the sake of simplicity) connected to plural mobile terminals 10 (again, only one is shown) so as to connect the mobile terminals 10 to the internet network 5 and to provide them with internet services; information providing servers 4 for providing information to the mobile terminals 10 via interface network 5 and interface units 1; and a central management server 2 for carrying out authentications of the mobile terminals 10 by performing data communications with a settlement server 3, for allocating dynamic IP addresses so that the mobile terminals 10 can execute internet searches, for releasing the dynamic IP addresses allocated to the mobile terminals 10 as the mobile terminals 10 receive internet connection termination signals from the interface units 1, for transmitting charge information with respect to the internet connection services to the settlement server 3, and for remotely managing the plural interface units 1. The settlement server 3 is an external settlement server for transacting the settlement functions in accordance with the reception of settlement information from the interface units 1 as users of the mobile terminals 10, connected to the interface units 1, input the settlement information to the interface units 1 by using settlement media for the internet connection services, that is, predetermined settlement cards, such as credit cards, IC cards, rechargeable cards, or the like.

The operations of the internet interface service system according to an embodiment of the present invention will be described in detail with reference to FIG. 2 and FIG. 3.

Figure 2:
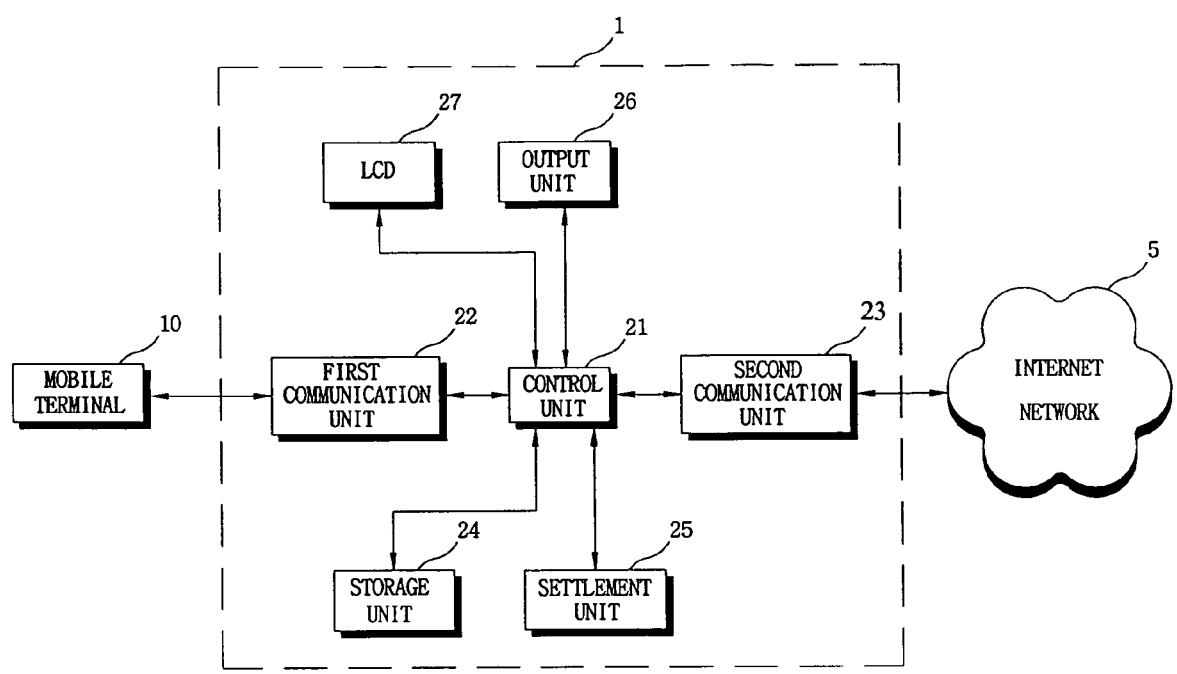
FIG. 2 is a block diagram showing the internal construction of the interface unit of FIG. 1.

FIG. 2 is a block diagram showing the internal construction of the interface unit of FIG. 1.

As shown in FIG. 2, the interface unit 1 includes a first communication unit 22 connected to the mobile terminal 10 of the user in order for the mobile terminal 10 to be connected to the internet network 5; a second communication unit 23 for connecting the interface unit 1 to a communication unit (not shown) in network 5; a storage unit 24 for temporarily storing and managing charge information with respect to the use of the interface unit 1, and a driver for storing operating programs of the interface unit 1 and for activating a network communication unit (not shown) mounted in the mobile terminal 10 of the user; a settlement unit 25 for inputting settlement information relative to the user from a settlement unit (not shown) in mobile terminal 10 in order to settle charges for internet connections of the mobile terminal 10; a liquid crystal display (LCD) 27 for displaying usage guidance information, connection information, and usage statement information for a user; an output unit 26 for outputting the usage statement of a user; and a control unit 21 for activating a communication channel with the mobile terminal 10 when the mobile terminal 10 is connected to the first communication unit 22, for transmitting to the settlement server 3 (FIG. 1) information as to a settlement medium of a user inputted from the settlement unit 25, for storing in the storage unit 24 charge information with respect to the connections to the mobile terminal 10, for transmitting the charge information to the central management server 2 and allocating, to the mobile terminal 10, a dynamic IP address allocated and transmitted from the central management server 2 if authorized, for outputting the charge information to the output unit 26 from the storage unit 24 while, at the same time, transmitting credit card information and connection charge information for a user through second communication unit 23 to the settlement server 3 of a credit card company when the settlement medium of the user is a credit card. When the settlement medium of the user is a rechargeable card, control unit 21 deducts the connection service charge from the rechargeable medium, transmits the deducted connection service charge to the central management server 2 when the connection of the mobile terminal with the interface unit 1 is terminated, and controls all of the components of the interface unit 1.

The second communication unit 23 may be a wireless communication unit capable of carrying out wireless communications without being connected to any external cable.

Figure 3:
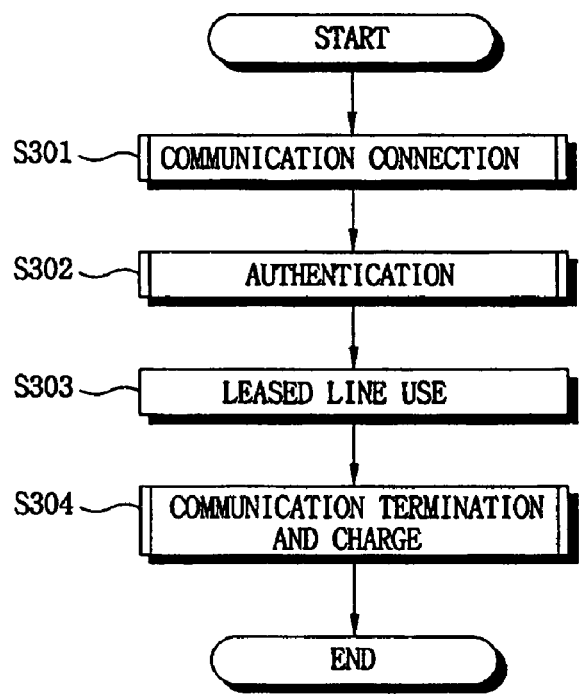
FIG. 3 is a flow chart of the process carried out by the internet interface service system according to an embodiment of the present invention.

FIG. 3 is a flow chart of the process carried out by the internet interface service system according to an embodiment of the present invention.

As shown in FIG. 3, as a mobile terminal 10 of a user is connected to the interface unit 1 through a connector, such as a LAN cable of the first communication unit 22 or a LAN cable connected to a LAN card which is provided in the interface unit 1, a communication unit (not shown) in the mobile terminal 10 is activated, and the control unit 21 in the interface unit 1 detects the activation, so that the internet interface service system activates a particular communication channel for the mobile terminal 10 of the user through the first communication unit 22, and carries out a communication connection with the mobile terminal 10 (S301).

When the communication connection is carried out, the control unit 21 inputs, from the settlement unit 25, card reader information on the settlement media of the user (for example, a credit card, a rechargeable card, an IC card, or the like) in order that charges regarding the use of the interface unit 1 by the user's mobile terminal 10 be settled, transmits the information to the settlement server 3 under control of the central management server 2, enables the central management server 2 to receive, through the interface unit 1 from the settlement server 3, a usage authentication signal with respect to the internet use, and transmits to the interface unit 1 a signal having a dynamic IP address to be allocated for the mobile terminal 10 and the usage authentication signal (S302).

The interface unit 1 receiving the dynamic IP address data and the usage authentication signal from the central management server 2 in step S302 allocates the received dynamic IP address to the connected mobile terminal 10 of the user so that the mobile terminal 10 of the user is provided with internet service by using the dynamic IP address allocated from the lines connected by the interface unit 1 and the central management server 2 (S303). When the mobile terminal 10 provided with the internet service through connection to the interface unit 1 terminates internet searches or the work being conducted through the internet network by using the interface unit 1, the mobile terminal 10 transmits a predetermined termination signal to the interface unit 1. The predetermined termination signal is, for example, an inactivation of the communication unit of the mobile terminal as in the power-off of the mobile terminal, or a communication channel termination signal automatically transmitted when an external connection is terminated from the mobile terminal 10 of the user, or a shutoff of the internet service provided from the interface unit 1 by selecting a connection termination appearing on a menu of the interface unit 1. When the interface unit 1 receives the connection termination signal, the connection termination signal is transmitted to the control unit 21 of the interface unit 1, the control unit 21 receiving the signal closes the communication channel connected with the mobile terminal 10 and indicates, on the liquid crystal display (LCD) 27, charge information stored in the storage unit 24 while at the same time outputting a usage statement through the output unit 26. Further, the charge information and the connection termination signal are transmitted from the interface unit 1 to the central management server 2, and, when the charge information is transmitted to the settlement server 3 in the charging process, the charge information is transmitted to the settlement server 3 through the central management server 2 so that the charges are transacted. Furthermore, the central management server 2, when receiving the connection termination signal from the interface unit 1, releases the setting of the dynamic IP address allocated to the mobile terminal 10 in order that a mobile terminal 10 connected with another interface unit 1 can use the dynamic IP address, and then it terminates the entire process (S304).

Figure 4:
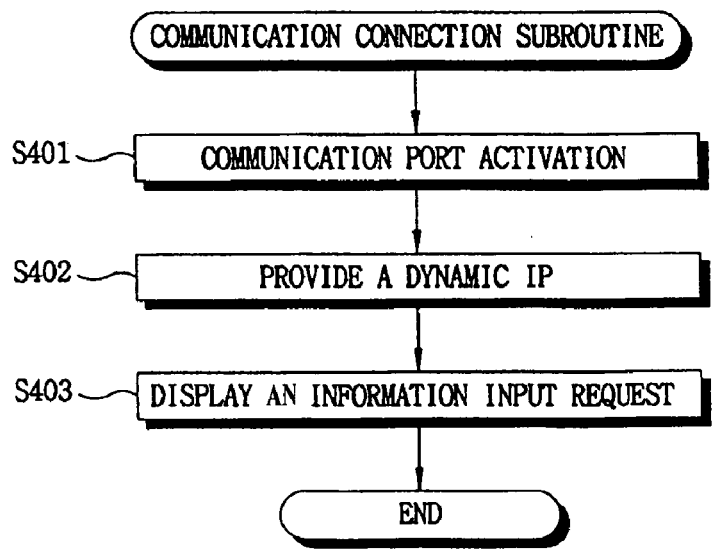
FIG. 4 is a subroutine for connection to the internet as executed in the flow chart of FIG. 3.

FIG. 4 is a subroutine for connection to the internet (S301) from the flow chart of FIG. 3.

The first communication unit 22 mounted in the interface unit 1 is one of the communication units implemented in the mobile terminal 10 of the user through a LAN cable, and is equipped with the LAN cable to which a LAN card is connected and is to be used if the LAN cable equipped with an RJ45 connector connected to the LAN card and the LAN card as a communication unit of a user's mobile terminal 10 are not provided. When a user connects, to mobile terminal 10, either a LAN cable of the first communication unit 22, provided in the interface unit 1, or a LAN cable to which a LAN card is connected, the control unit 21 of the interface unit 1 activates a communication port connected with the user's mobile terminal 10 (S401). In step S401, when a LAN card is not mounted as a communication medium in the user's mobile terminal 10, the user mounts in the mobile terminal a LAN cable having a LAN card connected to the first communication unit 22 of the interface unit 1. After that, the control unit 21 transmits to the central management server 2 a signal notifying of the activation of the communication port, while at the same time providing a dynamic IP address (S402) and outputting a message requiring insertion of a settlement medium into the liquid crystal display 27 of the interface unit 1 (S403).

Figure 5:
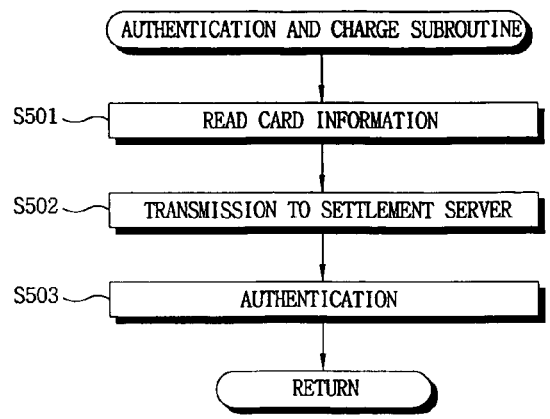
FIG. 5 is a subroutine for an authentication process as executed in the flow chart of FIG. 3.

FIG. 5 is a subroutine of an authentication process carried out in the flow chart of FIG. 3.

As a user inserts a user's settlement medium into the settlement unit 25, the settlement unit 25 reads information on the settlement medium and transmits the read information to the control unit 21. The control unit 21 encrypts the information on the user's settlement medium in accordance with a predetermined reference, and transmits the encrypted information to the settlement server 3 through the central management server 2 (S501, S502).

The settlement server 3, receiving the information from the settlement medium, decodes the received information and, when the settlement medium is authorized, server 3 transmits to the central management server 2 a signal approving the settlement medium of the user. The central management server 2, receiving the approval signal for the user from the settlement server 3, transmits one of the IP addresses allocatable as a dynamic IP address of the stored IP addresses to the interface unit 1 so as to allocate the dynamic IP address to the mobile terminal 10 of the user connected to the interface unit 1, and so that the mobile terminal 10 of the user is authenticated and can be connected to the internet network (S503). In this step S503, if the settlement medium of the user is not authorized, the central management server 2 outputs an error message, and the communication is terminated.

Figure 6:
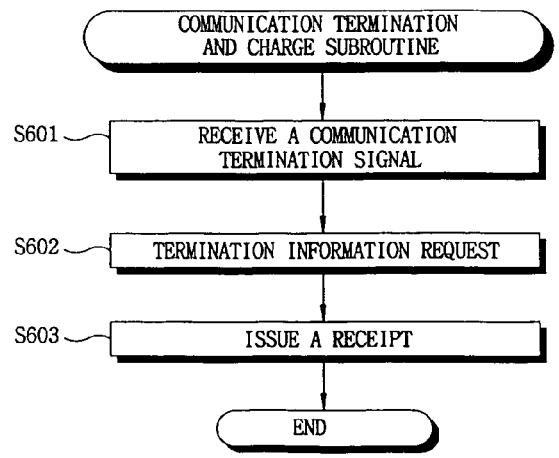
FIG. 6 is a subroutine for a communication termination and charge process as executed in the flow chart of FIG. 3.

FIG. 6 is a subroutine for the communication termination and charge process function shown in the flow chart of FIG. 3.

When the user wishes to terminate work through the interface unit 1 with a mobile terminal 10, forced termination methods are employed in which a communication medium connecting the mobile terminal 10 of the user to the interface unit 1 is forcibly interrupted or the power to the mobile terminal 10 of the user is turned off, or a connection termination menu in the menu outputted on the liquid crystal display 27 of the interface unit 1 is selected for termination.

When the control unit 21 of the interface unit 1 receives a connection termination signal (S601), termination information is, in effect, requested (S602), and usage time information and usage fee information for the user are outputted on the liquid crystal display (LCD) 27 of the interface unit 1 by a charge device stored in the storage unit. At the same time, the control unit 21 of the interface unit 1 transmits usage time information, usage fee information, and a connection termination signal to the central management server 2. The usage time information and the usage fee information of the user, transmitted from the interface unit 1, are sent to the settlement server 3 to carry out the charge of the usage fee, and the central management server 2 releases the allocation of the dynamic IP address allocated to the mobile terminal 10 according to the connection termination signal. Next, the control unit 21 of the interface unit 1 uses the charge device provided in the storage unit 24 to transmit the charge information on the connection time period of mobile terminal 10 to the output unit 26, prints the charge information by means of a printer device or the like, thereby providing a receipt (S603), and then terminates the process.

The above stated connection termination signal includes a normal termination signal, an abnormal termination due to a power-off of the user's mobile terminal 10, and a connection termination from a menu displayed on the liquid crystal display 27 of the interface unit 1. In the case of an abnormal termination, the control unit 21 of the interface unit 1 determines the abnormal termination through the detection of a "no signal input" condition from a LAN card.

It should be noted that the above-stated internet connection service may be obtained by employing a leased line providing high-speed internet connection services.

Schematically describing the above-stated internet interface service system again, as one example, a high-speed leased line is established, a small booth is constructed in a special location in a public place and the high-speed leased line is placed therein, and facilities such as a connection medium, a chair, a desk and the like are supplied in the booth.

In addition, from the above-stated configuration, the central management server 2 may have member information contained therein, so that a rechargeable card issued by a business operating the internet interface service system may be used for settlement. In such case, member identity numbers and the amounts of money registered in rechargeable cards or IC cards are stored in the central management server 2 for use in settlement. Further, the central management server 2 can be associated with a settlement server carrying out credit card settlements as a proxy for such credit card settlements.

Describing the construction of the central management server 2 in detail with respect to the above-stated internet interface service system, although not shown in the figures, the central management server 2 has a user database, a database for the interface units 1, and a DHCP server which can dynamically allocate IP addresses, the latter being built into the central management server 2 or established in a separate computer to be operatively associated with the central management server 2. Further, plural interface units 1 can be connected to the internet network, and, if a communication medium, a storage medium and a predetermined operating program are installed, a control unit is included to control the entire central management server 2.

As stated above, the internet interface service system and method according to the present invention enable users to conduct their work through connections to a communication network (or internet communication network) with the use of their portable mobile terminals in public places, such as airports, conference places and bus terminals where the interface units, according to the present invention, are installed.

It should be understood that the present invention is not limited to the particular embodiment disclosed herein as the best mode contemplated for carrying out the present inven-

What is claimed is:

1. An internet interface service system providing high-speed connection services to mobile terminals carried by respective users in public places, said system comprising:
    an internet network for providing the high-speed connection services;
    plural interface units, one for each of said mobile terminals, for connecting the mobile terminals of said respective users to the internet network so as to provide the respective users with internet services; and
    a central management server connected to the internet network and responsive to the input into the interface units of settlement information relating to the mobile terminals for carrying out usage authentications of the mobile terminals by performing data communications with an external settlement server which carries out settlements upon reception of the settlement information from the interface units, said central management server allocating dynamic IP addresses enabling the mobile terminals to carry out internet searches, and said central management server being responsive to reception, by a given mobile terminal from a corresponding interface unit, of a signal terminating a corresponding internet connection for releasing a corresponding dynamic IP address allocated to the given mobile terminal and for transmitting charge information with respect to a corresponding internet connection service of the given mobile terminal.

2. The internet interface service system as claimed in claim 1, wherein the mobile terminals are at least one of notebook computers, palm top computers, network computers and PDAs.

3. The internet interface service system as claimed in claim 1, wherein each interface unit comprises:
    a first communication unit connected to a corresponding mobile terminal;
    a second communication unit connected to the internet network for performing communications with the central management server via the internet network, for transmitting a mobile terminal-requested signal to the internet network, and for enabling said each interface unit to receive a signal comprising information searched in the internet network;
    a storage unit for storing at least one of communication port activation data for said each interface unit, settlement information, encryption data, and deciphering data, and for storing operating programs for carrying out input and output with respect to usage information of the corresponding mobile terminal;
    a settlement unit responsive to user input of settlement information into the corresponding mobile terminal in order to settle charges for the use of said each interface unit of the corresponding mobile terminal for reading and transmitting the settlement information from the corresponding mobile terminal;
    an output unit responsive to connection of the corresponding mobile terminal to said each interface unit, input of the settlement information by the user, approval of the settlement information by the central management server, conduct of work through the internet network, and termination of the conducted work, for outputting a statement of usage charges with respect to the usage times of the corresponding mobile terminal;
    liquid crystal display (LCD) means for displaying the statement outputted by the output unit for visual confirmation of the user, and for performing a function as a user interface for the user; and
    a control unit responsive to connection of the corresponding mobile terminal to the first communication unit for activating a communication channel for the corresponding mobile terminal, for transmitting to the external settlement server the settlement information of the user, responsive to an approval signal for receiving the dynamic IP addresses from the central management server for allocation to the corresponding mobile terminal, for storing in the storage unit charge information with respect to the connections of the corresponding mobile terminal, for outputting the charge information from the storage unit to the output unit and the liquid crystal display means while, at the same time, transmitting the charge information to the central management server and the settlement server through the second communication unit when the connections of the corresponding mobile terminal and said each internet interface unit are terminated, and for transmitting to the central management server a signal releasing the allocated dynamic IP addresses.

4. The internet interface service system as claimed in claim 3, further comprising a local area network (LAN) cable for connection between the first communication unit and the corresponding mobile terminal.

5. The internet interface service system as claimed in claim 4, wherein the LAN cable is connected to a LAN card mounted in the corresponding mobile terminal.

6. The internet interface service system as claimed in claim 3, wherein the storage unit stores driver information for at least one LAN card provided in said each interface unit.

7. The internet interface service system as claimed in claim 3, wherein the storage unit stores programs for performing charges for the corresponding mobile terminal.

8. The internet interface service system as claimed in claim 3, wherein the settlement unit is a card reader for reading a credit card.

9. The internet interface service system as claimed in claim 3, wherein the second communication unit carries out wireless communications.

10. An internet interface service method providing high-speed connection services to mobile terminals carried by respective users in public places, comprising the steps of:
    when a mobile terminal of a user and an internet interface unit are connected by any of a local area network (LAN) cable provided in a first communication unit and a LAN cable connected to a LAN card, establishing a communication channel with the mobile terminal by use of a control unit so as to activate a communication unit in the mobile terminal, the control unit being included in the internet interface unit;
    outputting from the control unit a message requesting user entry of settlement information in order to settle charges for use of the internet interface unit by the mobile terminal of the user after the establishment of the communication channel, and, when the user enters the settlement information, reading the settlement information, transmitting the settlement information to a settlement server through a central management server, and receiving a settlement approval from the settlement server;
    after receiving the settlement approval, receiving a dynamic IP address from the central management server, allocating the received dynamic IP address to the mobile terminal, and performing data communications by means of the data terminal through the internet interface unit and an internet network connected to the internet interface unit; and when a predetermined connection termination signal is inputted to the internet interface unit by a connection termination menu provided in one of the mobile terminal and the internet interface unit, terminating the communication channel of the mobile terminal by means of the control unit, outputting charge information stored in a storage unit to an output unit and a display unit while, at the same time, transmitting the charge information by means of the control unit to the central management server and the settlement server through a second communication unit, thereby performing a charging function.

11. An interface service system for use with a network providing high-speed connection service to mobile terminals carried by users in public places, said system comprising:

plural interface units, one for each mobile terminal, for connecting said each mobile terminal to the network; and a central management server for controlling use of the interface units by the mobile terminals;

wherein said central management server is responsive to entry of settlement information by users via the mobile terminals for carrying out usage authentications of the mobile terminals, and for allocating addresses to the mobile terminals in order for the mobile terminals to carry out network searches;

wherein said central management server is responsive to a given mobile terminal receiving, from a corresponding interface unit, a signal relating to termination of connections for releasing the addresses allocated to the given mobile terminal; and wherein said central management server transmits charge information with respect to the network connection services of the mobile terminals.

12. The interface service system as claimed in claim 11, wherein said central management server carries out the usage authentications by communicating with an external settlement server.

13. The interface service system as claimed in claim 11, wherein said central management server transmits the charge information to an external settlement server.

14. The interface service system as claimed in claim 11, wherein said central management server remotely manages the plural interface units.

15. The interface service system as claimed in claim 11, wherein each interface unit comprises:

a first communication unit connected to a corresponding mobile terminal; and a second communication unit connected to the network for performing communications with the central management server via the network, for transmitting a mobile terminal-requested signal to the network, and for enabling said each interface unit to receive a signal comprising information searched in the network.

16. The interface service system as claimed in claim 11, wherein each interface unit comprises:

a storage unit for storing at least one of communication port activation data for said each interface unit, settlement information, encryption data and deciphering data, and for storing operating programs for carrying out input and output with respect to usage information of a corresponding mobile terminal.

17. The interface service system as claimed in claim 11, wherein each interface unit comprises:

a settlement unit responsive to user input of settlement information into a corresponding mobile terminal in order to settle charges for the use of said each interface unit of the corresponding mobile terminal for reading and transmitting the settlement information from the corresponding mobile terminal.

18. The interface service system as claimed in claim 11, wherein each interface unit comprises:

an output unit responsive to connection of a corresponding mobile terminal to said each interface unit, input of the settlement information by the user, approval of the settlement information by the central management server, conduct of work through the network, and termination of the conducted work for outputting a statement of usage charges with respect to the usage times of the corresponding mobile terminal.

19. The interface service system as claimed in claim 18, wherein each interface unit comprises:

liquid crystal display (LCD) means for displaying the statement outputted by the output unit for visual confirmation of the user, and for performing a function as a user interface for the user.

20. The interface service system as claimed in claim 11, wherein each interface unit comprises:

a control unit responsive to connection of a corresponding mobile terminal to the first communication unit for activating communication channels for the corresponding mobile terminal.

21. The interface service system as claimed in claim 11, wherein each interface unit comprises:

a control unit for transmitting, to an external settlement server, the settlement information input by the user.

22. The interface service system as claimed in claim 11, wherein each interface unit comprises:

a control unit responsive to an approval signal for receiving the addresses for allocation to a corresponding mobile terminal.

23. The interface service system as claimed in claim 11, wherein each interface unit comprises:

a control unit which receives the addresses for allocation to a corresponding mobile terminal, stores in a storage unit charge information with respect to connections of the corresponding mobile terminal, outputs the charge information from the storage unit to an output unit and a liquid crystal display while, at the same time, transmitting the charge information to the central management server and a settlement server through a communication unit when the connection of the corresponding mobile terminal to said each interface unit is terminated.

24. The interface service system as claimed in claim 11, wherein each interface unit comprises:

a control unit which transmits, to the central management server, a signal releasing the allocated addresses.

* * * * *